United States Patent [19]
Johnson, Jr. et al.

[11] 3,978,757
[45] Sept. 7, 1976

[54] INSTRUCTIONAL DISPLAY DEVICE OPERATED RESPONSIVE TO THE PLAYING OF STRINGED MUSICAL INSTRUMENTS

[75] Inventors: William T. Johnson, Jr., Winston-Salem; James B. Joseph, Jonesville, both of N.C.

[73] Assignee: Sightar Incorporated, Winston-Salem, N.C.

[22] Filed: Mar. 19, 1975

[21] Appl. No.: 559,791

[52] U.S. Cl. .............................. 84/485 R; 84/314
[51] Int. Cl.² ........................................ G01G 1/02
[58] Field of Search ............ 84/171, 314, 464, 470, 84/471, 477, 478, 485

[56] References Cited
UNITED STATES PATENTS

| | | | |
|---|---|---|---|
| 490,358 | 1/1893 | Montanelli | 84/171 |
| 2,547,535 | 4/1951 | Pierce et al. | 84/478 |
| 3,403,591 | 10/1968 | Weitzner | 84/485 |
| 3,664,036 | 5/1972 | Boswell et al. | 84/478 X |
| 3,827,330 | 8/1974 | Ward | 84/472 |
| 3,845,686 | 11/1974 | Salvo | 84/485 |

*Primary Examiner*—Lawrence R. Franklin

[57] ABSTRACT

Separate areas of a display board are selectively activated either separately or in various combinations to illustrate a chord diagram, a fingerboard diagram, and/or a musical staff diagram. Lamps in each of the three diagrams are illuminated responsive to the playing of a specially constructed stringed instrument by the instructor to illustrate finger positions in the case of the chord diagram and the fingerboard diagram, and to illustrate musical position of the notes played on the scale diagram. One or more lock-in switches cause the activated lamps to remain lighted after the strings of the musical instrument are released by the instructor. Finally a digital readout lamp associated with each string on the chord diagram illustrates the finger which should be used to depress the corresponding string at the location indicated by the lamp.

4 Claims, 7 Drawing Figures

INSTRUCTIONAL DISPLAY DEVICE OPERATED RESPONSIVE TO THE PLAYING OF STRINGED MUSICAL INSTRUMENTS

BACKGROUND OF THE INVENTION

The recent advent of audiovisual type teaching methods have also been applied to the instruction of music and musical instruments. Various audiovisual instructional devices have been developed for use with the teaching of piano. A visual or display type device for stringed musical instruments of the type wherein strings are depressed along a fingerboard at various positions to obtain different notes and chords is even more adapted to instruction with display type devices than other types of instruments. This is especially true for chord type instruments such as the guitar.

There have been previous attempts to develop display type teaching devices for use with stringed instruments, such as guitar, as evidenced by the Weitzner U.S. Pat. No. 3,403,591 and the Ward U.S. Pat. No. 3,827,330. The Weitzner patent is directed to more of a self-instruction type of procedure in which a trial and error technique is used. A fingerboard display connected to the guitar is activated by a coded sheet of music. Successful duplication of the chord on the guitar itself advances the music and extinguishes the lamp indicating means for the previous chord.

In the Ward U.S. Pat. No. 3,827,330, a display board is illuminated responsive to the playing of the instrument by an instructor or student to illustrate by lamps on a modified fingerboard representation the proper string depression patterns to achieve selected chords. Although the Ward type apparatus achieves some of the objects to provide a suitable instructional device, certain problems are still not solved. For example, many instructors and/or students prefer to use a chord diagram, as opposed to a fingerboard representation. Alternatively, some instructors prefer to use a chord diagram and a fingerboard representation. The Ward apparatus does not include a chord diagram. Moreover, and more importantly, when the instructor releases the string, in the Ward apparatus, the lamps are extinguished, therefore the teacher does not have freedom to move around and help the students while the chord representation remains illuminated. Also, it is not possible to show how one chord may be built on another by keeping the lamps corresponding to one chord illuminated as one or more other chords are illustrated on the fingerboard diagram. Further, there is no readout on the Ward apparatus for showing the fingering of the chord, i.e. the student cannot determine which finger should be used on which string, which is very important in forming some chords.

SUMMARY OF THE PRESENT INVENTION

In the instructional device according to the present invention, however, an illuminated display panel includes a graphic representation of a chord diagram as well as an illustration of the fingerboard of the instrument. The chord diagram and fingerboard are so arranged that either one or both may be illuminated as the instructor desires. Further, in a preferred embodiment, although not necessarily required, a third section of the display panel includes a score of staff diagram, so that the student may also be made aware of the written scaler relation between notes of the chord which is being played.

The electrical arrangement of the lamps includes a lock-in switch corresponding to each of the chord diagram, fingerboard illustration, and staff diagram, which, when activated, causes the lamps in the corresponding area illustrating a selected chord to remain illuminated, even though the instructor releases the strings or even plays a second chord. This is very important to the successful use of the apparatus. Further, the chord diagram includes a digital readout lamp associated with each string to indicate the fingering of the chord to the student.

The chord diagram, the fingerboard diagram, and the scale diagram are separated within the display apparatus by baffles or internal walls, so that as one area is illuminated, the light therein does not spread to the adjacent areas unless the other areas are to be utilized also. In other words, the instructor can activate the chord diagram section of the display panel while the fingerboard and scale diagrams remain inactive and completely dark.

On the musical instrument itself, it is shown in the Weitzner U.S. Pat. No. 3,403,591 that the frets can be made in segments and made electrically conductive to generate a signal upon depression of the string. This has created some problems, however, in that when the frets are made to be conductive, there is a possibility that the string may engage two frets when it is depressed, i.e. the string on either side of the depression point, which could result in an erroneous chord representation on the display. In the present invention, however, this problem is alleviated by embedding metallic discs at the point of depression in the fingerboard behind the frets, rather than in the fret itself, so that two successive fret positions cannot be activated by a single depression.

It is therefore an object of the present invention to provide an illuminated display device for the instruction of stringed instruments of the type having a fingerboard which is either fretted or non-fretted in a new and improved way.

It is another object of the present invention to provide an illuminated display device of the type described which includes a chord diagram representation as well as a fingerboard representation, each of which include illuminating means to indicate chord formation thereon.

It is a further object of the present invention to provide an illuminated device of the type described wherein either the chord diagram or the finger board diagram may be used alone or with the other simultaneously.

It is yet another object of the present invention to provide an illuminated display panel of the type described wherein the chord illuminated on either the chord diagram or the fingerboard representation may be locked in and remain illuminated even after the instructor has released the strings which form the chord.

It is still a further object of the present invention to provide an illuminated display panel of the type described in which a digital readout lamp is positioned adjacent each string on the chord diagram to indicate to the student the proper fingering of the chord structure.

Yet another object of the present invention is to provide an illuminated display panel of the type described in which an illuminated staff diagram is provided on the panel and used either alone or in conjunction with the chord diagram and/or the fingerboard diagram to indicate to the student the musical relationship of the notes forming the selected chord on a staff diagram as well as in terms of the chord diagram or fingerboard diagram.

Other objects and a fully understanding of the present invention will become apparent upon reading the following detailed description of the preferred embodiment in conjunction with the accompanying drawings in which.

DETAILED DISCLOSURE OF A PREFERRED EMBODIMENT

Figure 1:
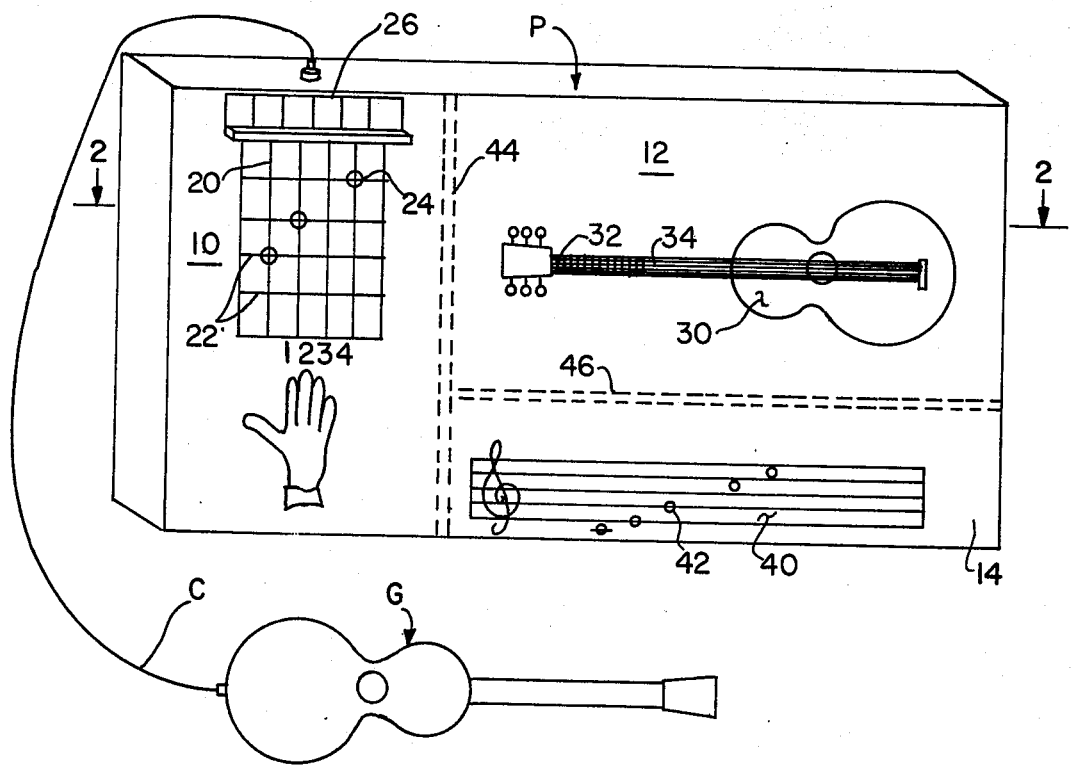
FIG. 1 is a front elevational view of the illuminated display device with the instructor's stringed instrument attached thereto in accordance with the present invention.

Turning now to the drawings, and particularly to FIG. 1, there is illustrated the display panel P and the specially constructed instructional guitar G electrically connected thereto for operation as described hereinafter. The panel P includes, in the preferred embodiment, three separate areas 10, 12 and 14, the area 10 adapted to selectively illustrate a chord diagram, the area 12 illustrating a fingerboard diagram, and the area 14 illustrating a musical staff diagram. It should be noted from the outset that although both the chord diagram area 10 and the fingerboard diagram 12 are considered to be necessary to the function of the invention, the staff diagram area 14 could be eliminated if desired, without departing from the scope of the invention.

When activated, the chord diagram area 10 shows a number of vertical, parallel, spaced lines 20 which represent the strings of the instrument on which instruction is being given. A plurality, preferably 5 horizontal lines 22 represent 5 consecutive frets of the instrument. An indicating lamp 24 is positioned at or approximately near the intersection of each vertical string line 20 and horizontal fret line 22, so that, when activated responsive to the guitar G, one or more lamps 24 will represent the strings that must be depressed and the location at which they must be depressed to form a particular selected chord. As illustrated in FIG. 1, the appropriate lamps 24 have been illustrated as being illuminated to represent a C-major chord. A plurality of digital readout lamps 26 extend across the top of vertical lines 20, there being one readout lamp 26 corresponding to each string 20. The digital readout lamps 26 are manually activated from switches 84 on the guitar G to indicate to the student the proper finger combination to form the illuminated chord positions.

Turning now to the fingerboard diagram area 12, the representation of a guitar 30 may be selectively illustrated. The guitar illustration 30 includes a plurality of strings and frets, and in a similar manner to that shown in area 10, an indicator lamp 32 is positioned behind each string and fret intersection along the fingerboard 34 of the guitar for approximately 12 frets. The lamps 32 are also illuminated responsive to the forming of the chord on guitar G by the instructor.

Finally, in the staff diagram area 14, a musical staff 40 may be selectively activated to be visible to the student as desired by the instructor. As a chord is strummed on the guitar G, the lamps 42 behind the corresponding staff locations on the staff representation 40 are illuminated to illustrate to the student the scaler location of the notes that have been strummed on guitar G.

In general, there are certain novel features of the present invention. First of all, the areas 10, 12, and 14 are selectively activated by the instructor, so that the instructor may use either one of the areas, any two of the areas, or all three areas to illustrate the particular point he is trying to make to the students. The selection is made by the instructor by merely activating appropriate switches 106, 108, 110 on the rear of the display panel P (not shown in FIGS. 1 or 2, however illustrated in the electrical schematic in FIG. 6). In this regard, a vertical baffle 44 and the horizontal baffle 46 extend transversely of the display panel P from the front panel 48 to the rear cover 50 to divide the display panel into three separate areas. The baffles 44,46 are light sealed to the front panel 48 and rear cover 50 in some suitable manner, so that light from area 10 cannot spread to areas 12 or 14 and vice versa. The switch which activates area 10 also activates a lighting device (not shown) which illuminates the vertical and horizontal strings of the chord diagram in area 10, the guitar and finger board in area 12, and the staff 40 in area 14. However, the indicator lamps 24, 32 and 42 are not visible until the guitar G is strummed activating those lamps, in which case the lamps appear on the front panel 48.

The electrical circuit illustrated in FIG. 6, as will be described in more detail hereinafter, further includes a lock in switch means 82 which causes lamps 24, 32 and 42 to remain lighted after the strings on guitar G are released from their depressed condition. This allows the instructor freedom to move around and aid the students in obtaining the proper finger positioning, as well as to instruct the students regarding the building of chords and the scaler position of the notes within the chord on the staff diagram.

Figure 2:
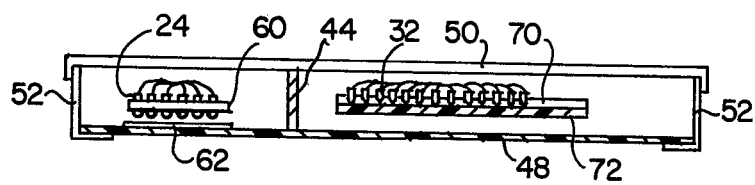
FIG. 2 is a sectional view taken substantially along lines 2—2 in FIG. 1.

Turning now to the specifics of the display panel P, as illustrated in FIGS. 1 and 2, front panel 48 and rear cover 50 are connected by means of a surrounding frame 52. Front panel 48 is of a darkened Plexiglas material, so that when nothing is illuminated or activated, the front panel appears to be completely dark, and nothing is visible behind it.

In area 10, a lamp mounting panel 60 is suitably secured within the chamber formed by front panel 48, rear cover 50, side frame 52, and baffles 44 and 46. Panel 60 includes means for suitably mounting the indicator lamps 24 therein and properly positioned in relation to the chord diagram which may either be painted onto the rear of front panel 48 as illustrated at 62 in FIG. 2, or which may be a separate panel secured to the front of panel 60 in front of the indicating lamp 24. The particular manner in which the lamps may be mounted with relation to the chord diagram representation are numerous, and it should merely be mentioned here that any suitable arrangement will suffice, as long as the lamps are so mounted that one lamp corresponds to each intersection of the strings and frets. The digital readout lamps are suitably attached above or along the top edge of panel 60, there being one lamp corresponding to each string representation 20. Each lamp 24 and digital readout lamp 26 is electrically connected to guitar G by wires running through conduit C as illustrated in FIGS. 6 and 7, so that they are operated responsive thereto.

The guitar graphic representation 30 in area 12 of the panel P is arranged similarly to the chord diagram representation in area 10, and for purposes of illustration, it is shown that the panel 70 which mounts the indicator lights 32 has a Plexiglas front panel 72 which illustrates the guitar itself with the strings, frets, and the like. In area 12, FIG. 2 illustrates the graphic representation of the guitar as being a separate panel 72 mounted to the front of mounting panel 70, rather than being painted on the rear side of front panel 46. It should be realized that the guitar representation could be painted on the rear surface of front panel 48 if desired. The staff representation in area 14 and corresponding lamps 42 are arranged similarly to the chord diagram and fingerboard representation described hereinabove, and it is not felt that additional description is necessary.

Figure 3:
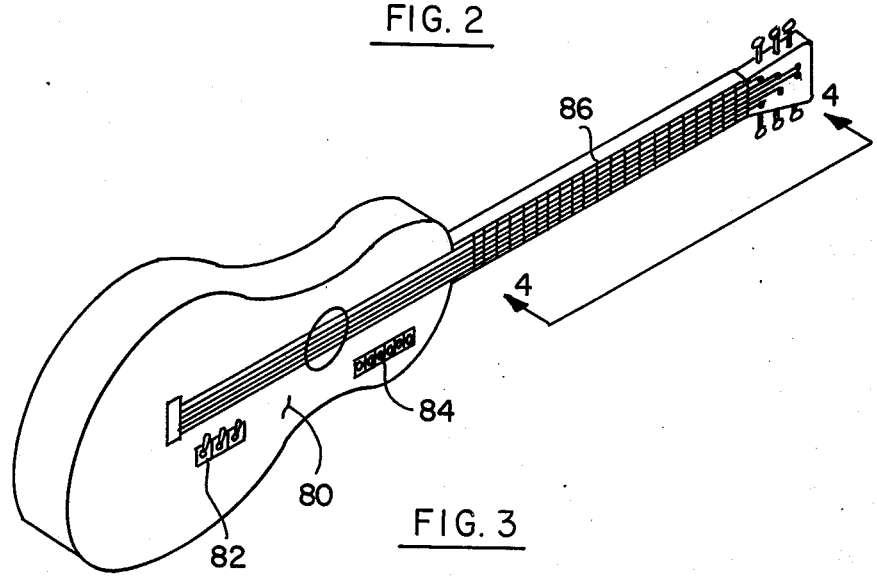
FIG. 3 is a perspective view of the stringed instrument adapted for use with the display board according to the present invention.
Figure 4:
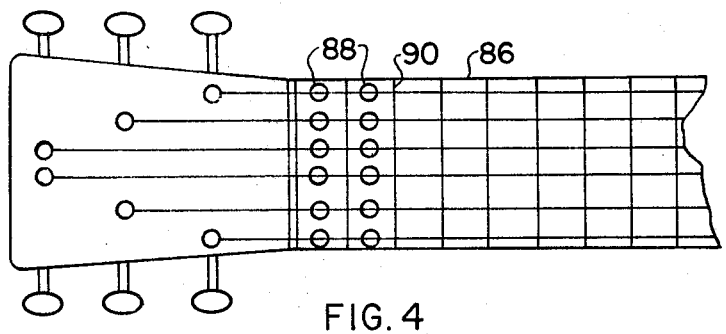
FIG. 4 is a partial front view taken substantially along lines 4—4 in FIG. 3.
Figure 5:
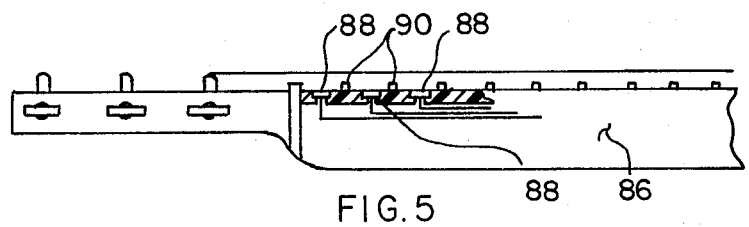
FIG. 5 is an enlarged, partial side view of the fingerboard of the stringed instrument in accordance with the present invention.

Turning now to the construction of the instructor's guitar G as illustrated in FIGS. 3–5, the guitar G is in general a conventional guitar, however with certain modifications made thereto. First of all, the body portion 80 includes a series of toggle switches 82 mounted thereon, which is in effect the lock-in switch means for causing the lamps to remain in the lighted condition even after the strings are released by the instructor. Another series of six rotary selector switches 84 mounted on the body portion 80 control the digital readout lamps 26, there being one such switch for each readout lamp. Each switch 84 includes an OFF position as well as at least five ON positions, each ON position corresponding to a different finger and one ON position corresponding to X. When a chord is strummed on the guitar, the instructor can then set the switches 84 to display in lamps 26 the proper fingering of the chord, it being understood that an unlit lamp or a lamp with a zero showing thereon is considered to be an open string.

The neck portion 86 of the guitar G is better illustrated in FIGS. 4 and 5. Rather than inserting conductive segments in the frets to complete the electricl connection as has been shown in the prior art devices, in the present invention, a plurality of conductive discs 88 are embedded in the fingerboard portion of guitar G at a point between frets 90 at approximately the position where the string is depressed by the finger to make contact with the fret. A wire connects the disc 88 with its corresponding lamp circuit as illustrated in FIG. 6. As the finger pushes the string onto the metallic disc, the activating circuit is completed between the lamps corresponding to the disc engaged and ground as illustrated in FIG. 6. The circuit is completed to illuminate the corresponding ones of selected lamps 24, 32 and 42. With such a set up, there is no possibility that a string can engage the discs 88 corresponding to two successive frets as in prior devices discussed hereinabove. It should be further pointed out that in the preferred embodiment the neck 92 of the guitar G is hollow, providing a conduit for the wires which connect each contact disc 88 to the corresponding lamps 24, 32 and 42.

Figure 6:
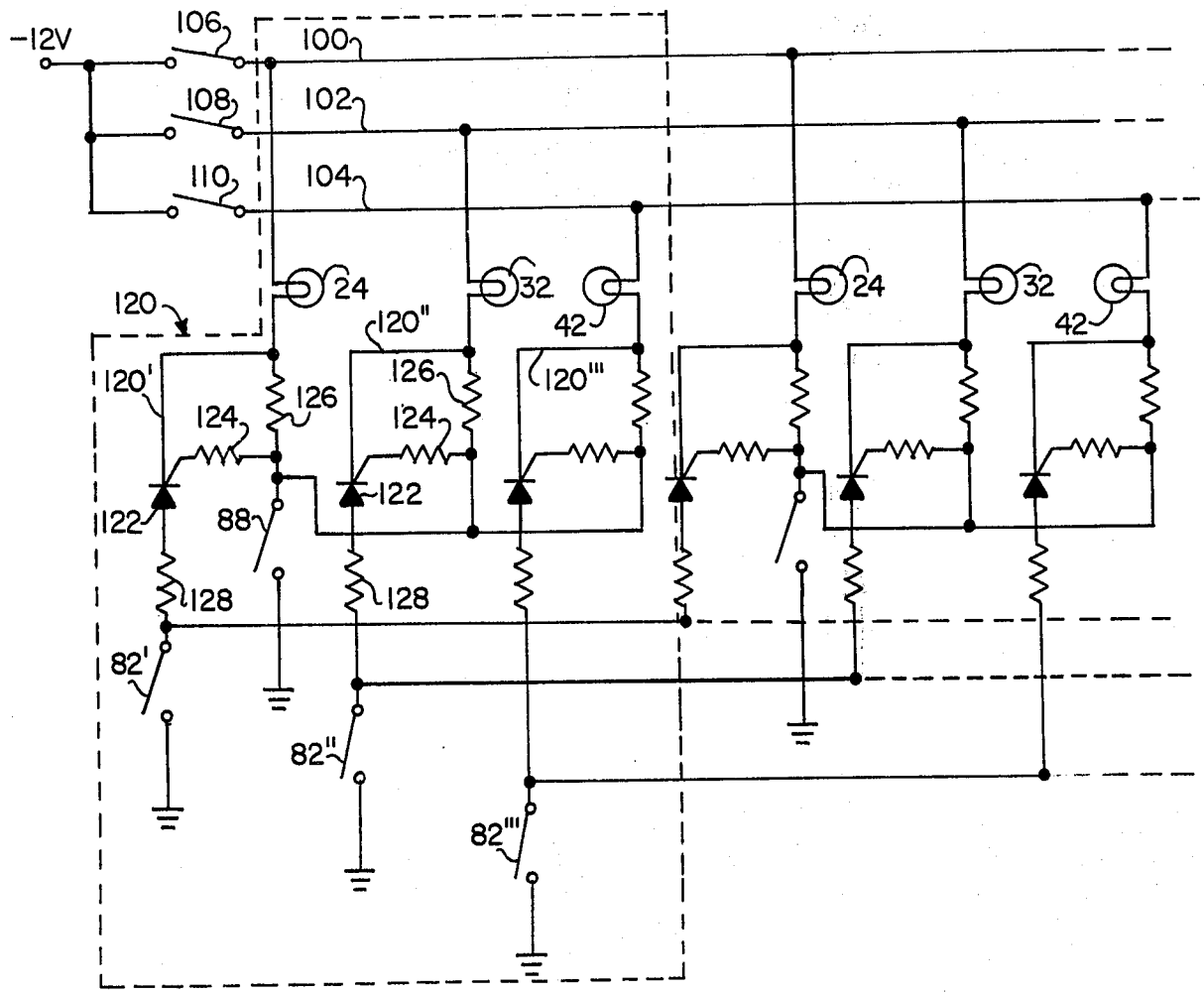
FIG. 6 is a simplified schematic representation of the electrical circuit of the system of the present invention, illustrating the manner in which the illuminating system is operated by depression of the strings.
Figure 7:
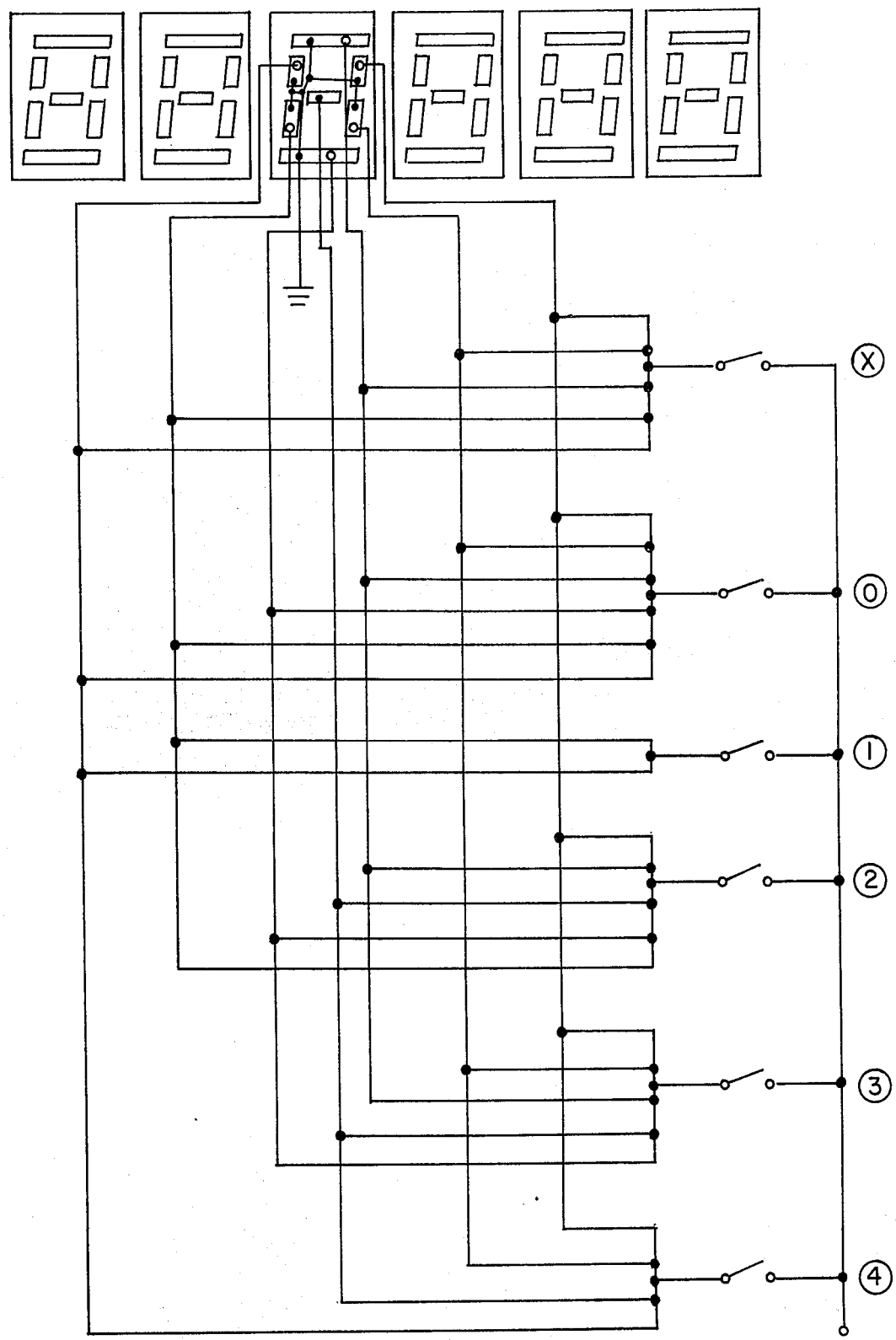
FIG. 7 is a simplified diagram of the electrical circuit of the digital readout mechanism of the apparatus.

Turning now to a discussion of the electrical circuitry, first of all, in FIG. 6 there is shown the electrical circuit which connects the disc contacts 88 on the guitar with the lamps of the chord diagram in area 10, the lamps 32 of the fingerboard diagram in area 12, and the notes on the staff 40 in area 14. As illustrated in FIG. 6, the power source for the display panel provides an incoming voltage of −12 volts. The incoming voltage is divided into three branches 100, 102 and 104, with branch 100 leading to the lamps 24 in the chord diagram, branch 102 leading to the lamps 32 in the fingerboard diagram, and branch 104 leading to the lamps 42 in the staff diagram. Selector switches 106, 108 and 110, selectively operate branches 100, 102 and 104 respectively.

The lamps 24, 32 and 42 which all correspond to the same string/fret intersection, or staff position in the case of lamps 42, are connected together by means of a note indicating activating circuit 120.

From each string/fret intersection, the switch 88 on one side is connected to ground, and the other side leads into the activating circuit 120. Within circuit 120, there is provided a silicon control rectifier 122. A first resistor 124 limits the current to the gate of the silicon control rectifier 122, while a second resistor 126 provides a biasing potential between the cathode of rectifier 122 and the gate thereof.

Lock-in switch 82' is connected between ground and a common line leading to all of the circuits leading to lamps 24. In the same manner, lock-in switches 82'' and 82''' are connected to and control the extinguishing of lamps 32 and 42 respectively. In each activating circuit 120, a current limiting resistor 128 keeps the current to the bulbs 24, 32 and 42 constant whether the lock-in switch 82 is activated or not. This insures that the bulbs are of the same brightness when activated whether the lock-in switch is connected or not. Otherwise, with the lock-in switch connected, the bulbs would be brighter than otherwise.

In FIG. 6, each set of indicating lamps 24, 32 and 42 which indicate the same note or finger position are illustrated within the dotted line portion, each lamp being controlled by a sub-activating circuit 120', 120'' and 120'''. A plurality of activating circuits 120 are provided, corresponding in number to the number of contact discs 88 on the neck piece of the instructional guitar G. A few representative circuits have been illustrated, however it is understood that they are continued until a circuit is provided from each disc 88 to the corresponding lamps 24, 32 and 42. Contact discs 88 below the fifth fret are connected to the lamps 24 of the chord diagram, so that the sixth fret positions on the guitar will be illuminated on the first fret of the chord diagram, seventh fret positions on the second fret of the chord diagram, etc.

FIG. 7 is illustrative of the circuitry for the digital readout lamps 26, which are commercially available numeral indicating lamps such as those used in digital clocks or calculators. Such lamps can be easily wired by connecting them to the rotary switches 84, so that when activated they display either the digits 0, 1, 2, 3, 4 or X, as illustrated in the schematic of FIG. 7.

Although a specific embodiment has been illustrated and described hereinabove, it is evident that various modifications and changes might be made without departing from the scope of the present invention, which is set forth in the following claims:

What is claimed is:

1. Display device for the instruction of stringed musical instruments of the type having a fingerboard comprising:
   a. a display panel having thereon a representation of a chord diagram with a plurality of intersecting vertical and horizontal lines representing strings and frets and a representation of at least the fingerboard portion of said stringed instrument with a plurality of intersecting vertical and horizontal lines representing strings and frets, said chord diagram and said fingerboard representation being selectively activated;
   b. a first light indicating means comprising indicator lamps mounted behind each of said line intersections on said chord diagram;
   c. a second light indicating means comprising indicator lamps mounted behind at least some of the line intersections on said fingerboard diagram;
   d. electrical means connecting the lamps in said first and second light indicating means with said musical instrument, said electrical means being activated responsive to the depression of the strings of said musical instruments to illuminate corresponding ones of said lamps; and
   e. said electrical means further comprising a circuit locking means selectively operable for causing at least one of said light indicating means to remain illuminated upon depression of further string combinations.

2. The display device according to claim 1 and further including a digital readout lamp mounted adjacent each string representation on said chord diagram for indicating the proper fingering of the chords illustrated thereon.

3. The display device according to claim 1 wherein said display panel further includes a staff diagram representation and a third light indicating means mounted behind each note location on said staff diagram, said third light indicating means also electrically connected to said musical instrument and operated responsive to the depression of the strings of said musical instrument, and said circuit locking means being connected also to said third light indicating means.

4. The display device according to claim 1 wherein said musical instrument includes contact discs adjacent the intersection of each string and fret, said contact discs being of a conductive material and imbedded in the surface of said fingerboard at a position immediately behind the corresponding fret, an electrical circuit connecting the lower end of each disc with a corresponding one of each of said first, second and third light indicating means, whereby the normal depression of a selected string will cause only one of each of said first, second, and third light indicating means to be illuminated.

* * * * *